Figure 1:
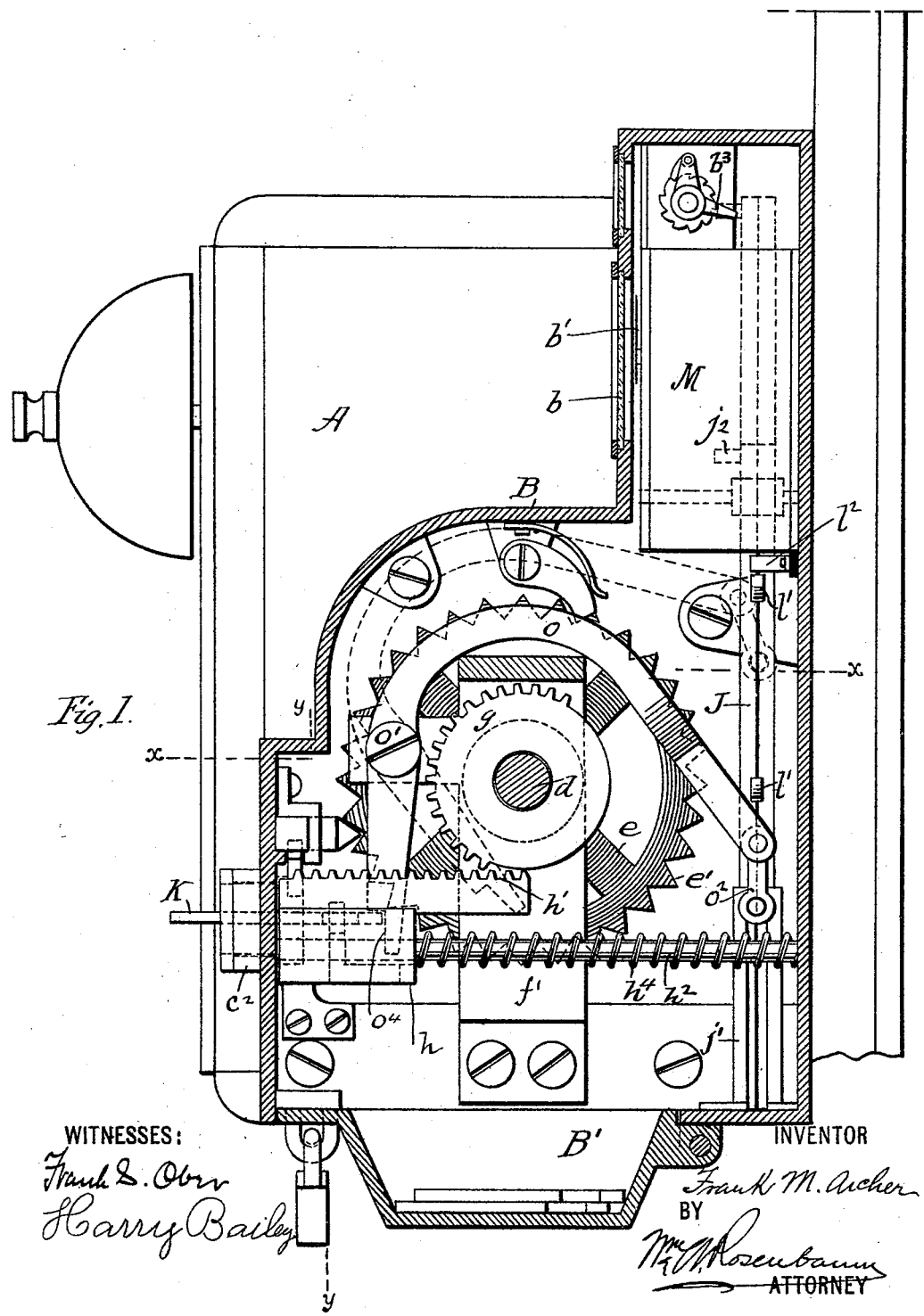

(No Model.) 4 Sheets—Sheet 1.

F. M. ARCHER.
TELEPHONE TOLL APPARATUS.

No. 582,714. Patented May 18, 1897.

WITNESSES:
Frank S. Ober
Harry Bailey

INVENTOR
Frank M. Archer
BY
M. Rosenbaum
ATTORNEY (No Model.) 4 Sheets—Sheet 3.
F. M. ARCHER.
TELEPHONE TOLL APPARATUS.

No. 582,714. Patented May 18, 1897.

WITNESSES:
Frank S. Ober
Harry Bailey

INVENTOR
Frank M. Archer
BY
W. J. Rosenbaum
ATTORNEY (No Model.)  
4 Sheets—Sheet 4.
F. M. ARCHER.
TELEPHONE TOLL APPARATUS.
No. 582,714. Patented May 18, 1897.
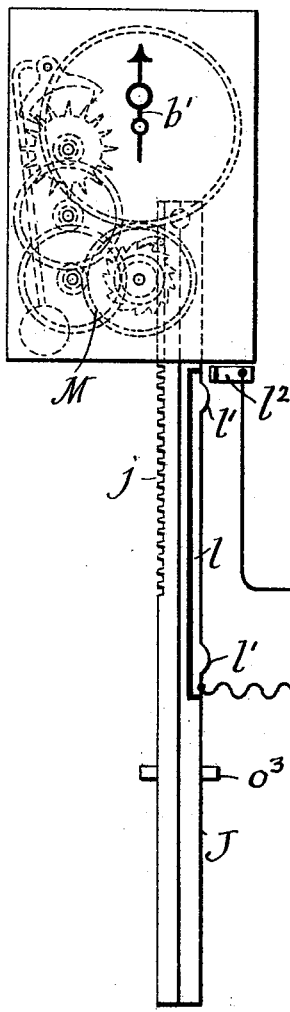
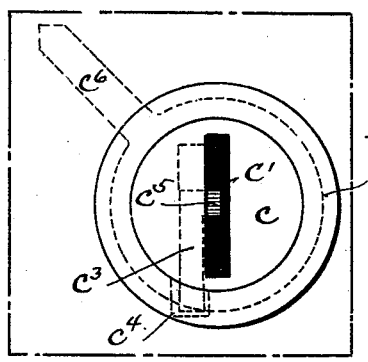
Fig. 10.
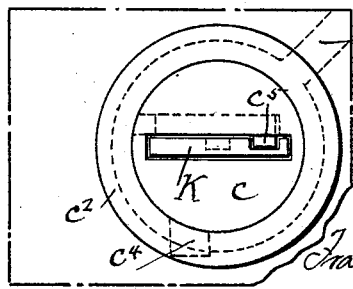
Fig. 7.
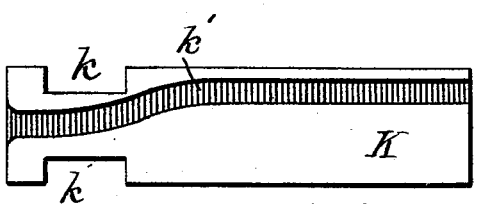
Fig. 9.
Fig. 8.
WITNESSES:
Frank S. Ober
Harry Bailey
INVENTOR
Frank M. Archer
BY
M. A. Rosenbaum
ATTORNEY
THE NORRIS PETERS CO., PHOTO-LITHO., WASHINGTON, D. C.

UNITED STATES PATENT OFFICE.

FRANK M. ARCHER, OF NEW YORK, N. Y., ASSIGNOR TO SIEGFRIED SILBERBERG, OF SAME PLACE.

TELEPHONE-TOLL APPARATUS.

SPECIFICATION forming part of Letters Patent No. 582,714, dated May 18, 1897.

Application filed April 30, 1896. Renewed January 9, 1897. Serial No. 618,675. (No model.)

*To all whom it may concern:*

Be it known that I, FRANK M. ARCHER, a citizen of the United States, residing at New York, in the county of New York and State of New York, have invented certain new and useful Improvements in Telephone-Toll Apparatus, of which the following is a full, clear, and exact description.

This invention relates to telephone-toll systems of that class in which any person may obtain the use of a telephone at a public station by paying a certain fee and without the aid of an attendant at the instrument either for the protection of the telephone company or as an assistant to the customer of the company.

Coin-operated vending devices are well known, and the same principle is carried out in this invention, except that instead of a coin being used to actuate the mechanism a key or peculiarly-shaped piece of metal is used. The object in making this substitution is to avoid placing money in public places to be a temptation to dishonest persons to break into the box or receptacle and secure the money. It is my intention to place the keys on sale at convenient places where they may be obtained in any quantity by persons having use occasionally for a telephone. In this way the key of course becomes of value, but it is not a legal tender and is therefore not so tempting to dishonest persons.

By my invention a person desiring the use of a telephone may approach the instrument, insert a key, and then ring up the central office. If the connection desired can be obtained, the customer manipulates the apparatus to carry the key entirely into the structure, where it falls into a receptacle, upon which the central office operator, who has been automatically notified of the fact that the key is deposited, makes the desired connection and permits conversation to be carried on. If the desired connection cannot be obtained on account of the line being "busy," or for any other cause, the central office notifies the would-be customer, and the key, which has been only partially inserted into the apparatus, may be withdrawn for use at a later time on the same or some other instrument.

The mechanism for carrying out this invention is of simple character and is adapted to be applied directly to the casing of the instruments now in use.

The invention consists of the construction and combinations of apparatus hereinafter particularly described and claimed.

Figure 2:
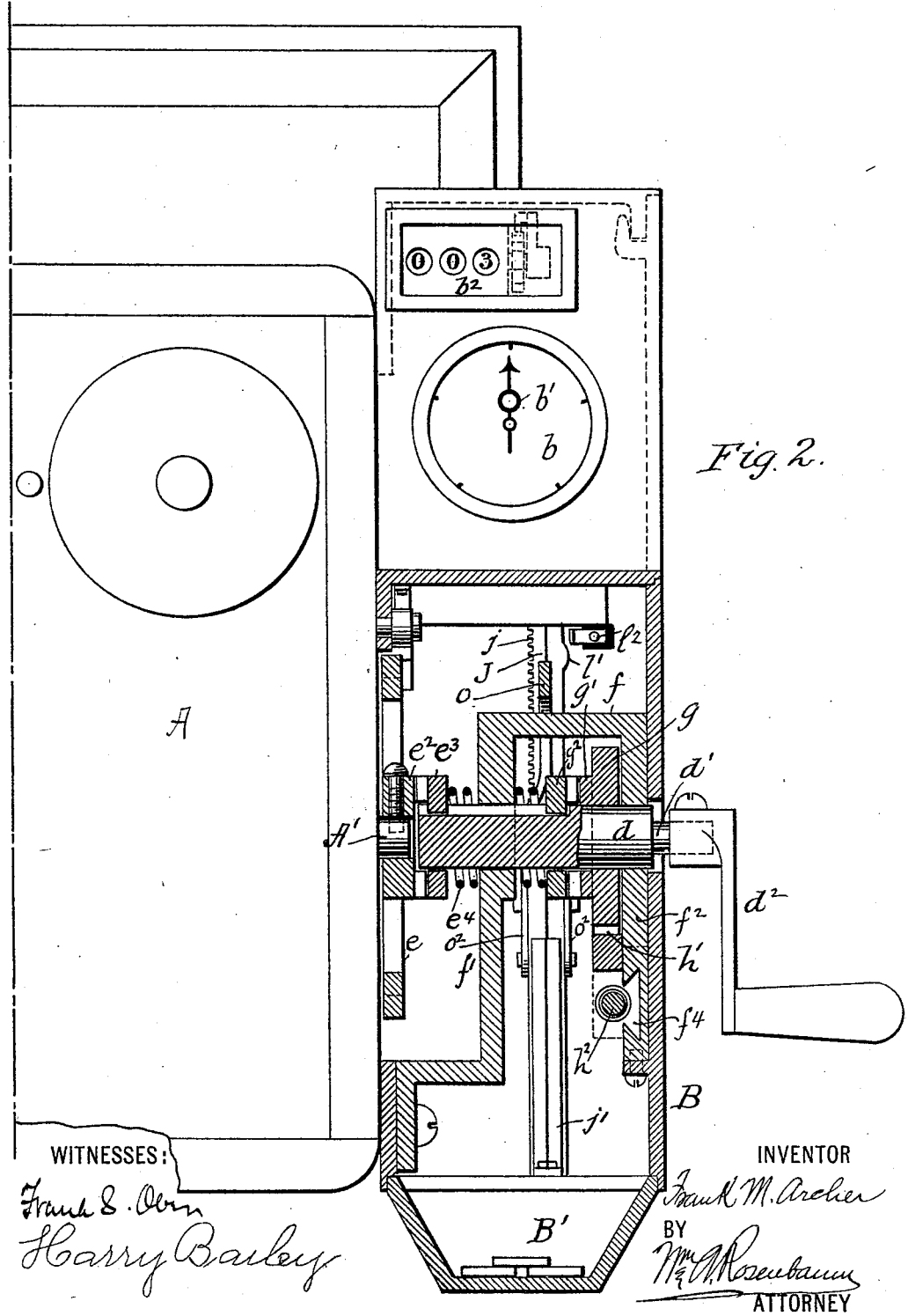
Figure 3:
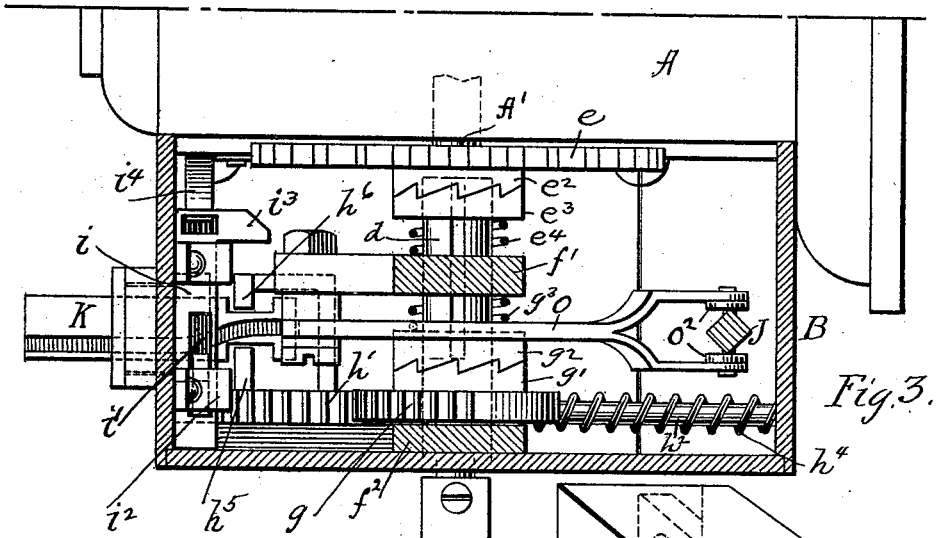
Figures 4, 5:
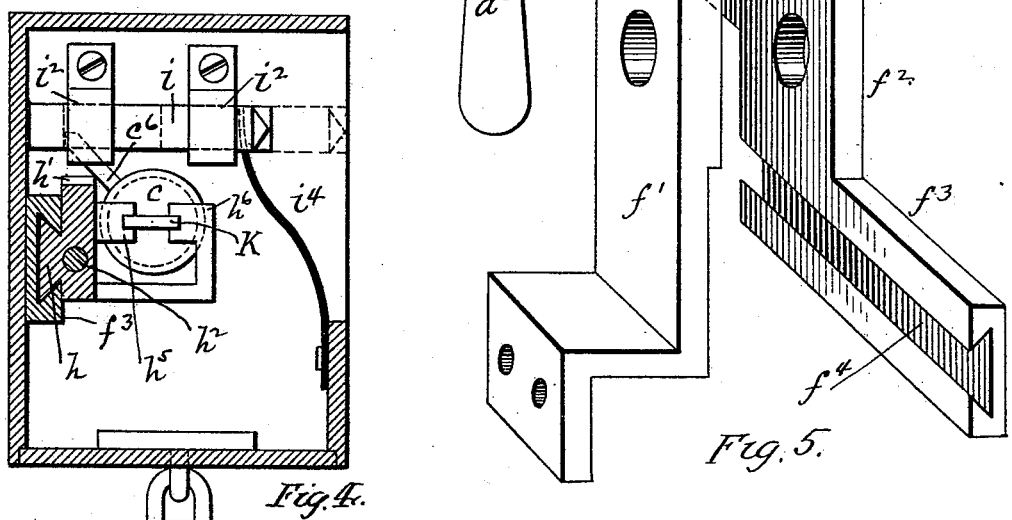
Figure 6:
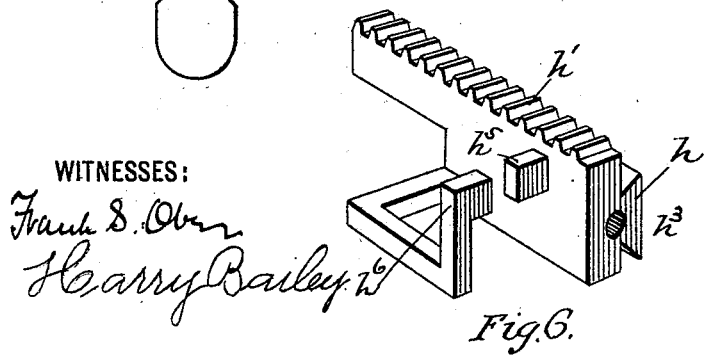

In the accompanying drawings, Figure 1 is a side elevation of the apparatus constituting my invention, the front of the case thereof being removed to disclose the mechanism within and a side elevation of the magneto call-box of the telephone being represented in the background. Fig. 2 is a vertical central section of the toll apparatus and a partial front elevation of the telephone-box to which it is attached. Fig. 3 is a sectional view on line $x\,x$ of Fig. 1. Fig. 4 is a section on line $y\,y$ of Fig. 1. Fig. 5 is a perspective view of a frame. Fig. 6 is a similar view of the key-carriage. Figs. 7 and 8 are views of the key-holder with its surrounding parts, the key being inserted therein in Fig. 8. Fig. 9 is a plan of the key. Fig. 10 is a diagram of the electrical circuits of the telephone, showing how the toll apparatus is connected in.

I have shown in the drawings a portion only of the ordinary telephone instrument, consisting of the magneto call-box A. Against the right-hand side of this box I fasten in any suitable manner the casing B, inclosing the mechanism constituting my invention. The upper part of this casing is provided with two windows, one of which discloses to the view a dial $b$ with an index $b'$ and the other an indicator $b^2$ of a counting device or register. In the lower front part of the case B a cylindrical key-holder $c$, provided with a keyhole $c'$, is mounted to oscillate in a barrel $c^2$, fixed in the casing. This key-holder carries a bolt $c^3$, that normally projects into a notch $c^4$ in the barrel to prevent the oscillation of the holder. This bolt is provided with a projection $c^5$, passing into the keyway and adapted to be engaged by the key to lift the bolt out of the notch and permit of the oscillation of the key-holder.

At A' is shown the end of the shaft of the magneto instrument, upon which is usually fastened the crank by which the central office is rung up. In applying my invention the crank is removed from the end of the shaft and applied to the outer projecting end $d'$ of the main shaft $d$ of my apparatus, said main shaft being in alinement with and practically forming an extension of the shaft $A'$. The crank is represented by $d^2$.

Upon the end $A'$ of the shaft is rigidly fixed a large wheel $e$, with its periphery provided with well-defined notches $e'$ and with its hub having formed on its outer face one member $e^2$ of a jaw-clutch, the other member $e^3$ being on the abutting end of shaft $d$, and the teeth of the clutch being so arranged that when the shaft $d$ is turned to the right or in the usual direction when ringing up the central office the parts of the clutch will engage and the magneto will be operated. The main shaft $d$ is mounted in a frame $f$ (shown in perspective in Fig. 5) and consists of two upright parts $f'$ and $f^2$, respectively, the latter having an extension $f^3$, with a dovetailed groove or track $f^4$, which will be described hereinafter.

The part $e^3$ of the clutch is keyed to the shaft, but adapted to slide longitudinally thereon. It is forced toward the member $e^2$ constantly by a spring $e^4$, surrounding the shaft and located between the frame $f'$ and the clutch member $e^3$. Between the parts $f'$ and $f^2$ of the frame the shaft carries a loose pinion $g$, having upon its inner face a clutch member $g'$, adapted to engage with a corresponding member $g^2$, which is keyed to the shaft, but adapted to slide thereon, and which is held against $g'$ by spring $g^3$. The teeth of this clutch are opposed to those of the clutch $e^2$ $e^3$, so that when one is locked or gripped the other is unlocked and sliding. Hence from the above description it will be understood that the clutch $g'$ $g^2$ locks and carries the pinion with the shaft only when the crank $d^2$ is turned to the left or in the reverse direction to that used when ringing up.

In the guide $f^4$ is placed a carriage. (Shown in Fig. 6.) This is provided with a projection $h$, fitting into the dovetailed groove and adapted to slide therein. The carriage is provided with a rack $h'$, which is in engagement with the pinion $g$, so that the rotation of the pinion will cause the carriage to slide in its guideway. The pinion, however, can be turned in only one direction by the shaft, and to provide for the return movement of the carriage I pass a rod $h^2$ through a longitudinal hole $h^3$ in the carriage and insert a spring $h^4$ between one end of the rod and one end of the carriage. The movement of the carriage under the action of the pinion compresses the spring, and when the pinion is released the spring returns the carriage to its normal position, as shown in Fig. 1. The key used consists of a flat metal plate (shown in Fig. 9 and lettered K) provided near its forward end with two rectangular notches $k$ $k$, located opposite each other and having along one face a cam-groove $k'$. This groove commences at the forward extremity of the key and midway between the edges and gradually curves toward one edge as it runs to the rear of the key.

The carriage before described is provided with two lugs $h^5$ and $h^6$, that are located directly back of the key-holder $c$, and with an opening between them in line with the keyhole $c'$. When the key is inserted through the keyhole, it passes through the opening between these two lugs until the two notches $k$ are in the same plane with the lugs, at which time the key may be rotated, the narrow part of the key between the notches just fitting in the opening between the lugs, as shown in Fig. 3; but when the key is in this position it cannot be withdrawn or forced inward by pushing or pulling the key itself, because the lugs will engage with the shoulders of the notches $k$ and prevent such movements. The cylindrical key-holder $c$ is provided inside the case with a radial finger $c^6$, that projects into an elongated opening $i'$ in the bolt $i$. This bolt is substantially supported transversely of the case in loops $i^2$ and carries at one end an angular projection $i^3$, that engages with one of the notches in the wheel $e$ and prevents rotation of said wheel. The bolt is held in this position by the spring $i^4$.

In the back of the case is mounted a heavy vertical rod J, preferably square in cross-section and having a rack $j$ on one of its corners. The lower end of this rod is stepped in a slitted tube $j'$, which acts as a guide for the rod. In the upper part of the casing is a clock-train M, with one of the wheels of which the rack $j$ engages. The rod carries a metallic strip $l$, which is a little longer than the length of the stroke of the rod and is electrically insulated from the rod. This strip has two projections $l'$ $l'$, adapted to make contact with a fixed finger $l^2$, as the rod rises and falls, in the manner hereinafter described. The extreme upper end of the rod is provided with a lug $j^2$, which when the rod is carried to the extremity of its upward stroke strikes a finger $b^3$ and turns the counting and registering mechanism $b^2$ one point or notch. The rod is elevated by means of a curved lever $o$, pivoted at the joint $o'$ and connected with the rod by means of links $o^2$, that are pivoted to trunnions $o^3$ on the rod, the lever being forked at the end to straddle the rod when it moves upward. The opposite end of the lever projects downwardly to a point directly opposite the keyway $c'$ and immediately back of the lugs $h^5$ $h^6$ on the carriage, as shown in Fig. 1. It is formed with a right-angled notch $o^4$, having a vertical side against which the end of the key is adapted to strike, and a horizontal side under which the end of the key is adapted to rest.

In Fig. 10 a diagram of the ordinary telephone-circuits is shown, the main line being indicated by wires $w$ and $w'$. Across the two wires and shunting the telephone apparatus is a circuit $p$, containing a battery $p'$, having one of its terminals connected to the contact-finger $l^2$, and the other by means of a flexible connection with the insulated strip $l$. Thus when the lugs $l'$ make contact with the finger $l^2$ an impulse is sent over the main line from battery $p'$ to the central station, which may be indicated there by the ringing of a bell or operation of any other suitable annunciator. In the bottom of the casing B a suitable receptacle B' is provided, into which the keys K fall and are retained until removed by an authorized person, who opens the receptacle by releasing the lock $B^2$.

The operation of the invention is as follows: A person desiring the use of the telephone first provides himself with a key K, which he may obtain at a drug-store, barber-shop, or other more or less public place by paying ten or fifteen cents or whatever the toll for an ordinary conversation may be. He passes the key into the keyhole $c'$ until it is stopped by the end of lever $o$, the key then being in the same vertical plane with the end of the lever. When the cam-groove $k'$ engages with the lug $c^5$, the latter immediately begins to rise with the further progress of the key until the bolt $c^3$ is entirely free of the notch $c^4$. He then gives the key a quarter-turn and entraps it by reason of the engagement of the lugs $h^5$ and $h^6$ with the notches $k$. At the same time he forces the key a little farther in to send its forward end beneath the horizontal shoulder on the extremity of lever $o$. This rotary movement of the key carries with it the key-holder $c$ and through finger $c^6$ throws the bolt $i$ out of engagement with wheel $e$. He may then let go of the key, leaving it projecting partially out of the case, the end of lever $o$ meanwhile preventing the backward rotation of the key under action of spring $i^4$. The magneto-shaft now being released, the customer rings up central office by turning the crank $d^2$ to the right, the motion being transmitted through clutch $e^2$ $e^3$, while clutch $g'$ $g^2$ slips. If the central operator can make the desired connection, the customer is told to go ahead. He then rotates crank $d^2$ in the opposite direction, which causes clutch $e^2$ $e^3$ to slip and clutch $g'$ $g^2$ to lock and rotate pinion $g$. The carriage therefore begins to travel toward the rear of the case, and the key is drawn into the case by reason of the engagement of lugs $h^5$ and $h^6$. The key in pushing against the end of lever $o$ swings that lever into the position shown in dotted lines in Fig. 1, lifting rod J to the upper limit of its stroke, and the key, being carried free of the key-holder $c$, falls into the receptacle B'. As rod J moves upward, two impulses from battery $p'$ are sent in rapid succession to central office and serve as a notification to the operator there that the key has been deposited in the case. The operator then perfects the connection between the customer and the person he has called for, and they commence their conversation. At the moment the rod J reaches the upper end of its stroke lug $j^2$ operates the register and then the rod immediately commences to fall by its own weight, but is retarded by the clock-train. This train is constructed to limit the period which the customer shall use the instrument. If, for instance, one key permits a customer to have conversation for three minutes, the rod will fall in just three minutes, the fractions thereof being indicated by the index $b'$. In falling the circuit of the battery is closed twice, but this time at an interval of three minutes. When the central operator gets the second signal, she is at liberty to cut off the connection or permit the conversing parties to hurriedly terminate their conversation. As soon as the key is deposited the customer releases the handle $d^2$ and spring $h^4$ returns the carriage to its normal position, the bolt $i$ having meanwhile gone to its normal position and locked the wheel $e$, thus making all parts of the apparatus ready for another customer. If after ringing up central office the would-be customer finds he cannot get the desired connection, he first slightly withdraws the key to release it from the end of lever $o$ and then rotates it backward a quarter-turn to carry the notches out of engagement with lugs $h^5$ and $h^6$. He can then withdraw the key and use it at any later time upon the same or another instrument.

Having thus described my invention, I claim—

1. The combination with the calling-instrument shaft of a telephone, a notched wheel thereon, a bolt adapted to engage the notches of said wheel, an oscillatory key-holder engaging with said bolt and means whereby a key may oscillate said holder to release the said shaft, as set forth.

2. The combination with the call-instrument shaft of a telephone, a notched wheel thereon, a bolt adapted to engage the notches of said wheel, an oscillating key-holder engaging with said bolt, a lock for the key-holder, and means for releasing the holder and oscillating the same to release the said shaft, substantially as described.

3. In a telephone-toll apparatus, a main shaft provided with two clutches, one connecting it with the calling apparatus and operative when the shaft is turned in one direction only, and the other connecting it with a key-carriage and operative when the shaft is turned in the opposite direction only, substantially as described.

4. In a telephone-toll apparatus operated by a key, the combination of a carriage with which the key engages when inserted, a shaft and connections between the shaft and carriage whereby the latter is moved when the former is rotated, substantially as described.

5. In a telephone-toll apparatus operated by a key, the combination of a key-carriage with which the key engages when inserted, a shaft and connections between the shaft and carriage whereby the latter is moved when the former is rotated, and a clutch for disconnecting the shaft from the carriage, substantially as described.

6. In a telephone-toll apparatus operated by a key, the combination of a key-holder, a key-carriage, means for locking the carriage and key together, and means for moving the holder to lock the key in, or release it from, the carriage, substantially as described.

7. In a telephone-toll apparatus operated by a key, the combination of a key-holder and a key-carriage adapted to engage with the key, the key-holder adapted to be oscillated to effect an engagement between the carriage and key, substantially as described.

8. In a telephone-toll apparatus operated by the insertion of a key, a main shaft adapted to send in a call when rotated in one direction and to entrap the key when rotated in the opposite direction.

9. In a telephone-toll apparatus operated by a key, a circuit-closer, a weight operating the same, a lever for lifting the weight and means whereby the insertion of the key will enable the customer to lift the weight, substantially as described.

10. In a telephone-toll apparatus operated by a key, a circuit-closer, a weight operating the same, a lever for lifting the weight, a clock-train regulating the return movement of the weight, and means whereby the insertion of the key will enable the customer to lift the weight, substantially as described.

In testimony whereof I subscribe my signature in presence of two witnesses.

FRANK M. ARCHER.

Witnesses:
FRANK S. OBER,
HARRY BAILEY.